(12) United States Patent
Balsells

(10) Patent No.: US 7,210,398 B2
(45) Date of Patent: May 1, 2007

(54) COVER SEALS WITH LATCHING LOCKING FEATURES

(75) Inventor: Peter J. Balsells, Newport Beach, CA (US)

(73) Assignee: Bal Seal Engineering Co., Inc., Lake Forest, CA (US)

( * ) Notice: Subject to any disclaimer, the term of this patent is extended or adjusted under 35 U.S.C. 154(b) by 166 days.

(21) Appl. No.: 11/058,864

(22) Filed: Feb. 16, 2005

(65) Prior Publication Data

US 2005/0212218 A1   Sep. 29, 2005

Related U.S. Application Data

(60) Provisional application No. 60/545,808, filed on Feb. 18, 2004.

(51) Int. Cl.
*F02F 5/00* (2006.01)
*F16J 9/12* (2006.01)

(52) U.S. Cl. .................. 92/194; 277/437; 277/452; 277/467

(58) Field of Classification Search ................ 92/194, 92/253, 254; 277/434, 435, 437, 449, 452, 277/453, 467, 472
See application file for complete search history.

(56) References Cited

U.S. PATENT DOCUMENTS

| | | | | |
|---|---|---|---|---|
| 3,820,739 A | * | 6/1974 | Graf | 242/573.7 |
| 4,678,210 A | * | 7/1987 | Balsells | 285/318 |
| 4,804,290 A | | 2/1989 | Balsells | |
| 5,161,806 A | * | 11/1992 | Balsells | 277/467 |
| 2003/0157846 A1 | * | 8/2003 | Poon et al. | 439/840 |

* cited by examiner

*Primary Examiner*—Michael Leslie
(74) *Attorney, Agent, or Firm*—Walter A. Hackler

(57) ABSTRACT

Seal apparatus includes a cover seal having a body and an extending cylindrical sleeve with the sleeve including a radial internal groove. A piston is provided having a circumferential groove and a biasing element is disposed between the internal and circumferential groove. Surfaces, disposed in the internal and circumferential grooves, orient the biasing element in order to effect sealing between the housing and the sleeve and an axial force to provide latching or locking between the seal and the piston.

5 Claims, 27 Drawing Sheets

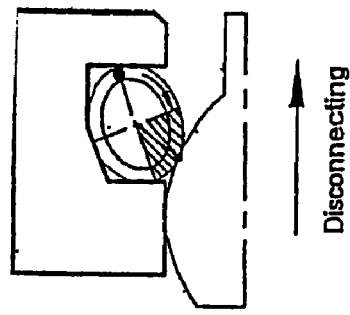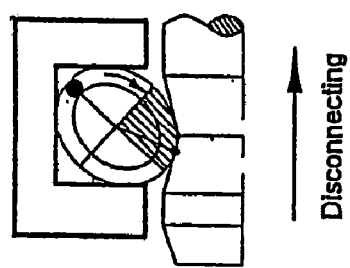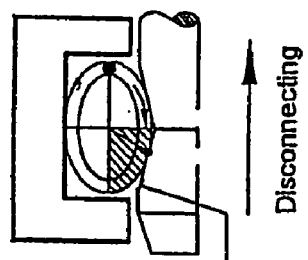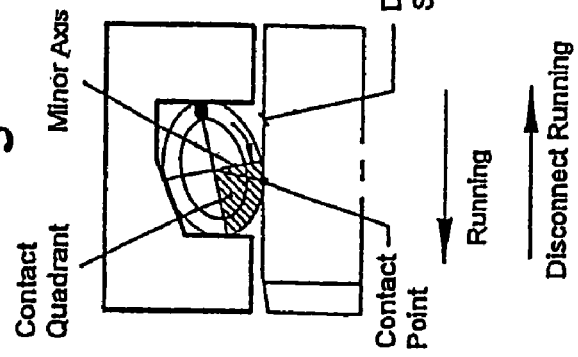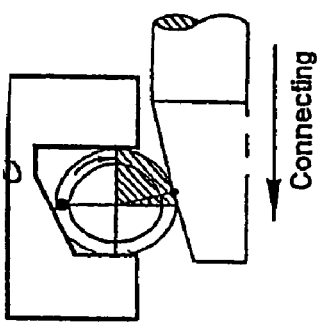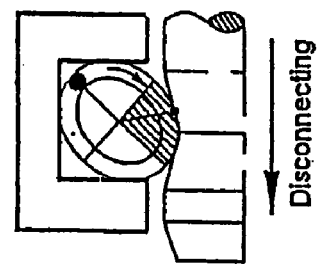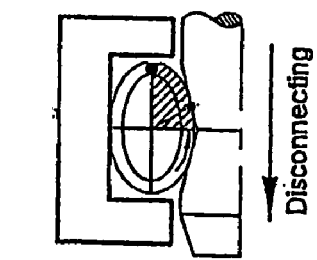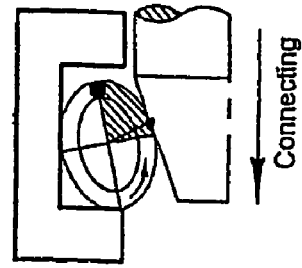

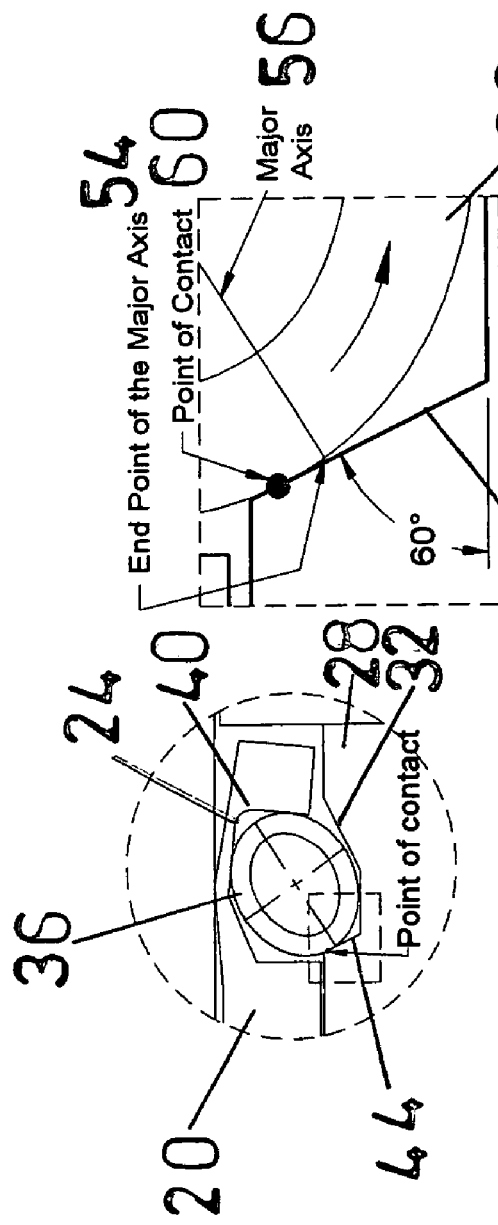

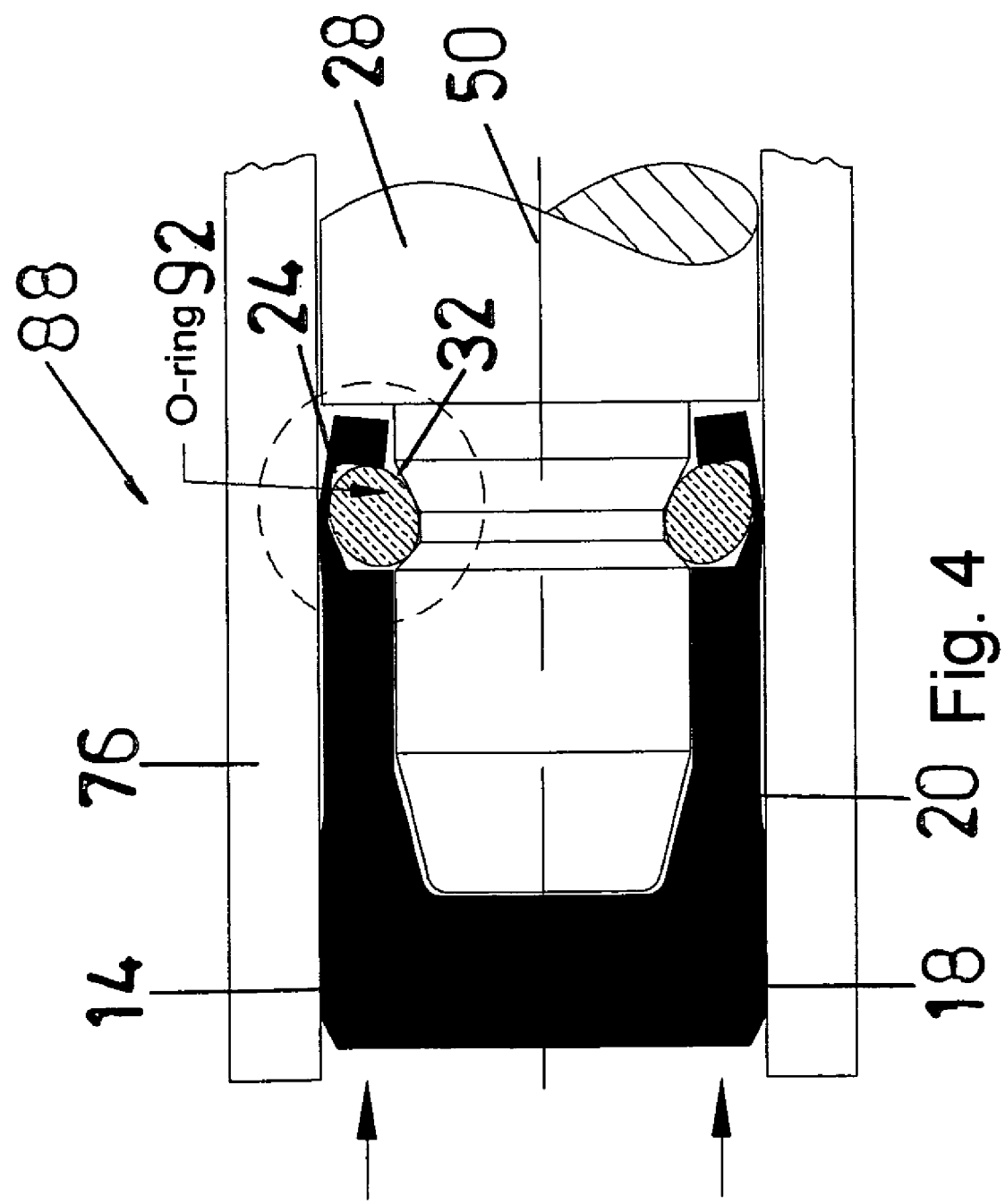

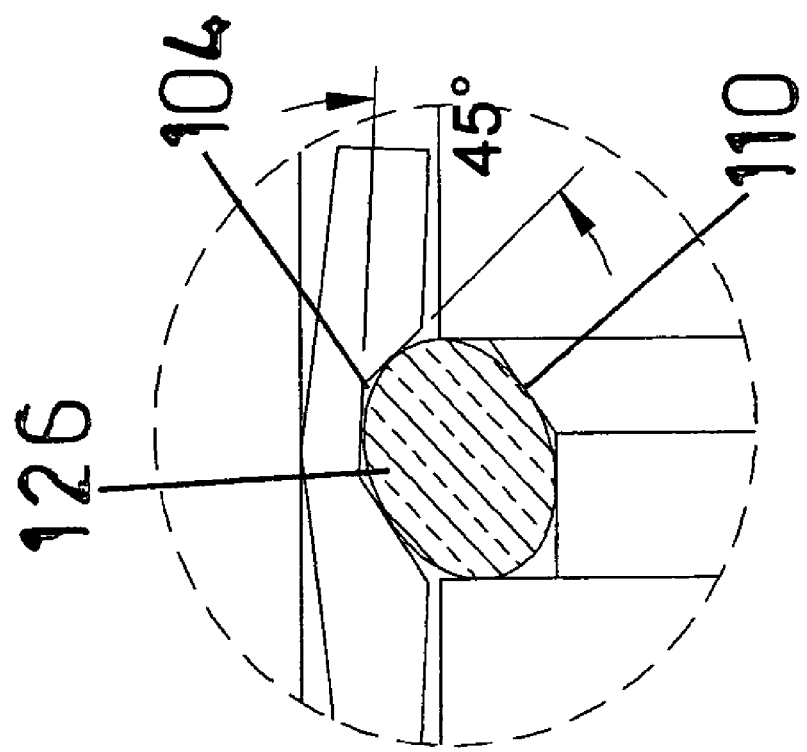

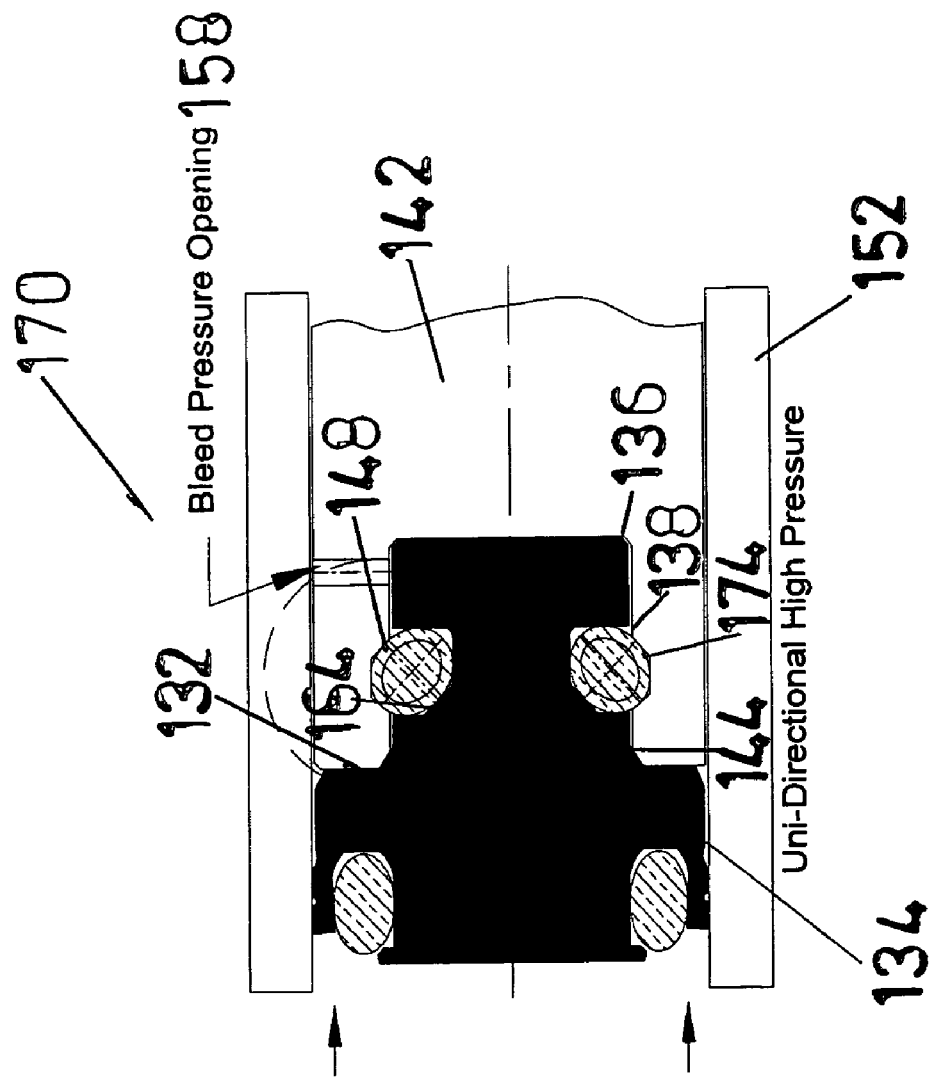

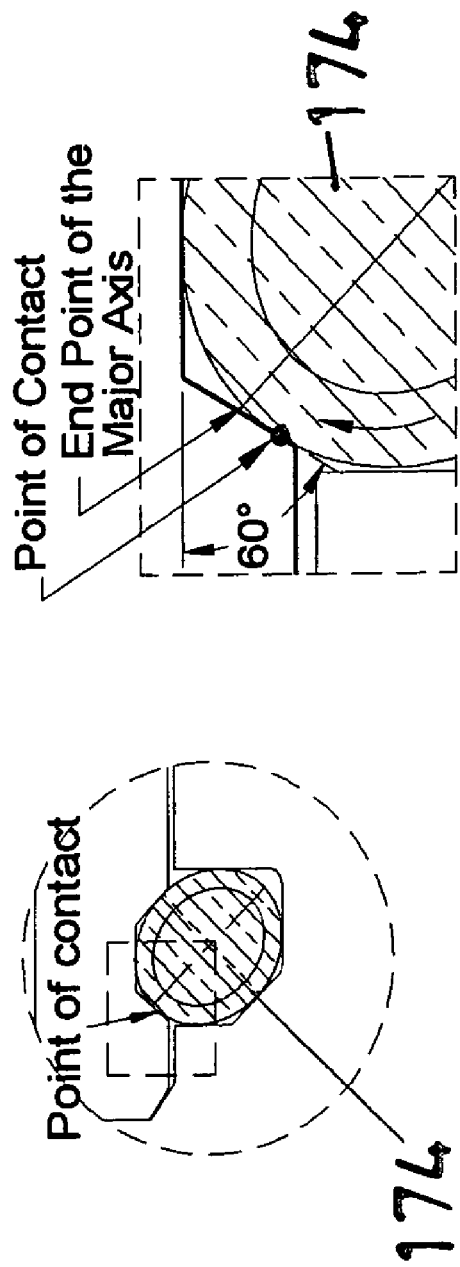
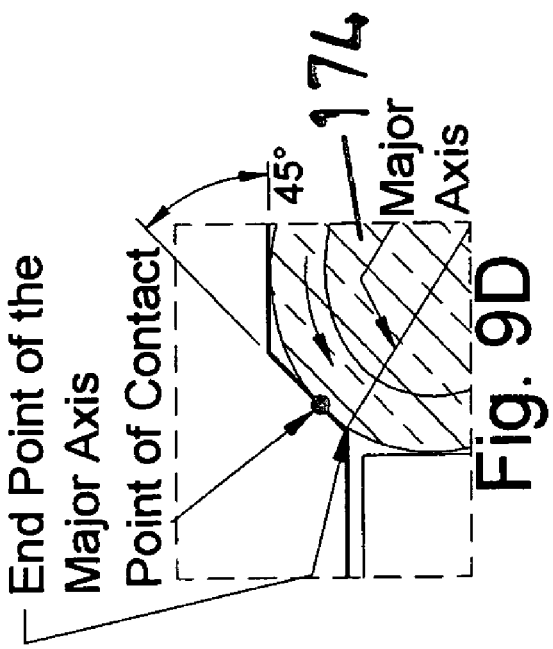
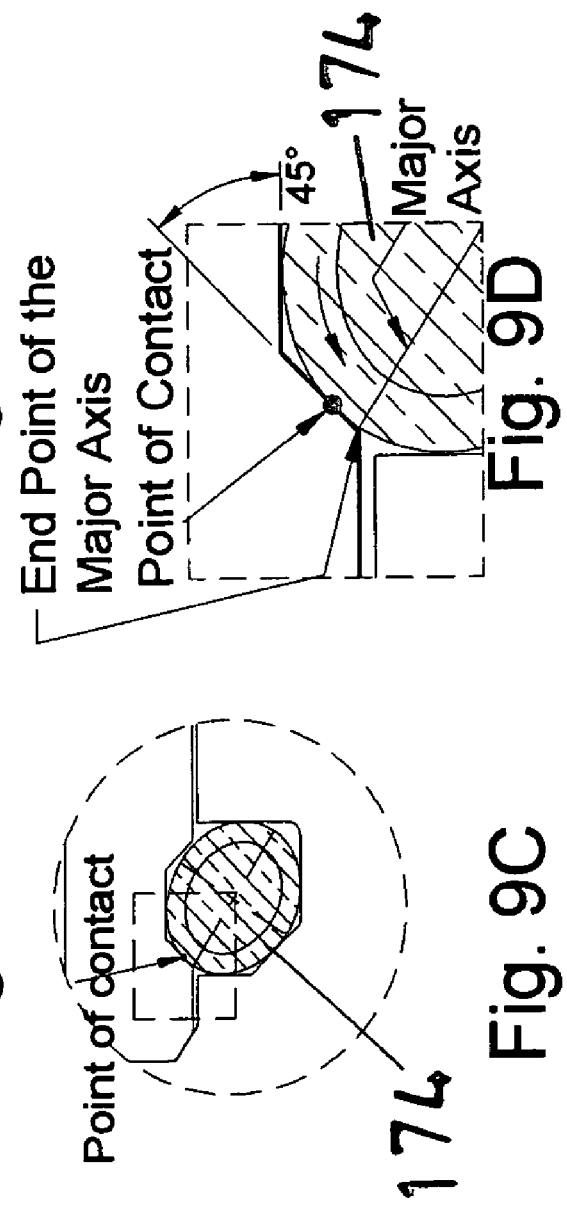

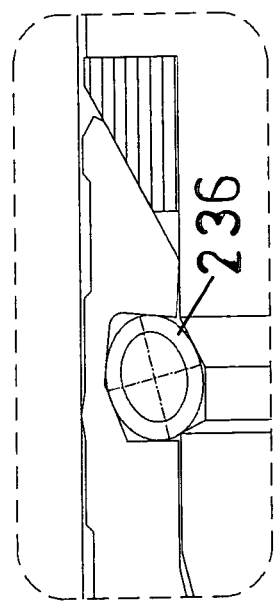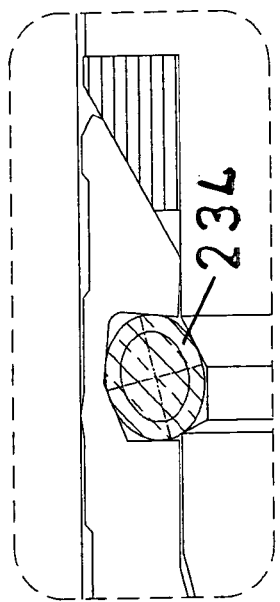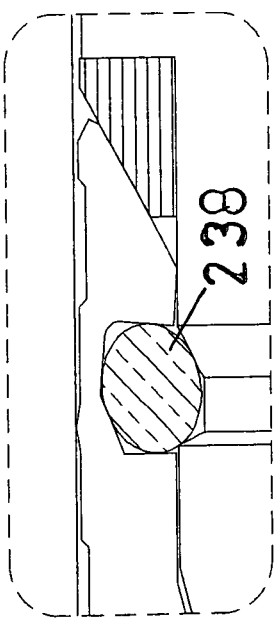

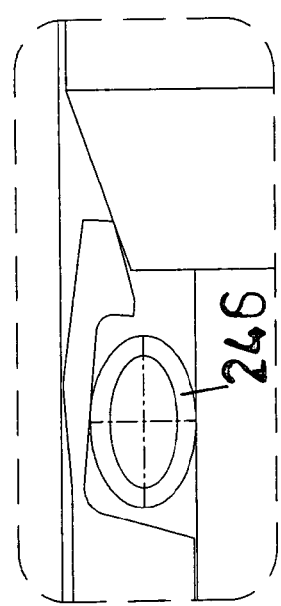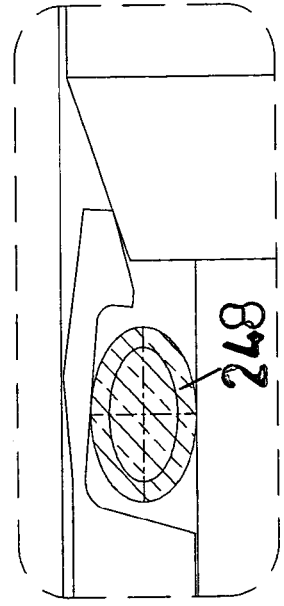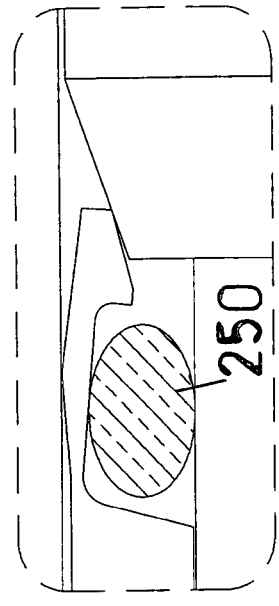

COVER SEALS WITH LATCHING LOCKING FEATURES

The present invention is a continuation of U.S. Ser. No. 60/545,808 filed Feb. 18, 2004 which is to be incorporated, in its entirety, into the present application.

The present invention is generally related to seals and is more particularly related to cover seals for pistons disposed in a housing for reciprocation therein while sealing fluids and/or gasses, such cover seals also providing a means for latching or locking the seal to the piston at various pressures.

The prior art cover seals have been developed as, for example, set forth in U.S. Pat. No. 4,804,290 to Balsells. This patent teaches a seal which is mounted on a piston and means are provided for holding the seal and the shaft together radially by not axially.

Unfortunately, after a repeated actuation or reciprocation of the piston, axial play develops between the seal and the shaft thereby causing loosening therebetween and eventually rendering the assembly ineffective for sealing.

The present application overcomes the deficiencies of the prior art and provides for a seal which is effective in sealing between a housing and the seal but also provides an axial force to provide latching and/or locking between the seal the underlying piston, such latching or locking, hereinafter defined, prevents said movement between the seal and the piston.

SUMMARY OF THE INVENTION

Seal apparatus in accordance with the present invention generally includes a cover seal having a body and an extending cylindrical sleeve with the sleeve having a radial internal groove.

A piston is provided having a circumferential groove therein and a biasing element, for example, a spring may be disposed within the internal and external grooves.

Surfaces disposed in the internal and circumferential grooves orient the biasing element in order to effect sealing between a housing and a sleeve and further provide an axial force to provide latching or locking between the seal and the piston.

More particularly, in accordance with the present invention, the biasing element may comprise an elliptical coil spring.

The internal groove may include a generally right angle shoulder and a circumferential groove may include an opposing angular shoulder and the elliptical spring is oriented by the right angle shoulder and the angled shoulder with a point of contact, between the elliptical spring and the angled shoulder, disposed above an endpoint of a major axis of the elliptical spring in order to provide locking between the seal and the piston.

In another embodiment of the present invention, the internal groove may include a generally right angle shoulder and the circumferential groove may include an opposing angled shoulder and the elliptical spring is oriented by the right angle shoulder and the angled shoulder for the point of contact, between the elliptical spring and the angled shoulder, disposed below the point load to provide latching between the seal and the piston.

Further, in either of these embodiments, an elastomer may be provided and fill the elliptical spring. In an alternative embodiment, the present invention biasing element may comprise and O-ring.

In yet another embodiment of the present invention, the circumferential groove may include the generally right angle shoulder and the internal groove may include an opposing angled shoulder and the elliptical spring is oriented by the right angled shoulder and the angled shoulder with a point of contact, between the elliptical spring and the angled shoulder, disposed below the point of load to provide locking between the seal and the piston.

A further embodiment of the present invention, the circumferential groove may include a generally right angled shoulder and the internal groove may include an opposing angled shoulder and the elliptical spring is oriented by the right angled shoulder and the angled shoulder with the point of contact between the elliptical spring and the angled shoulder disposed above an endpoint of a major axis of the elliptical spring to provide latching between the seal and the piston.

BRIEF DESCRIPTION OF THE DRAWINGS

A better understanding of the present invention may be had from consideration of the flowing detailed description, taken into conjunction with the accompanying drawings, in which:

FIGS. 1A–1H illustrate interaction between a canted coil spring and dynamic surfaces;

FIGS. 2A and 2B are enlarged diagrams of the biasing elements in relative position between an endpoint of a major axis of the spring and a point of contact in order to provide locking between the cover seal and the piston;

FIGS. 2C and 2D provide enlarged views showing orientation of the surface to provide the latching between a cover seal and a piston, the difference between the latching and locking being hereinafter described in greater detail;

FIGS. 9, 9A, 9B, 9C, 9D is a design similar to that shown in FIG. 8 except that a spring loaded O-ring, that is, a spring filled with an elastomer is utilized;

FIGS. 13, 13A, 13B, 13C, illustrate a snap-on cover seal for low and high pressure applications with a canted coil spring utilized for locking and loading at low pressure and a spring loaded O-ring utilized for higher pressure applications; and FIGS. 14, 14A, 14B, 14C illustrates a cover seal wherein permanent locking occurs between the piston and the seal.

DETAILED DESCRIPTION

A brief discussion of the behavior of a canted coil spring under load will facilitate understanding of the present invention since force characteristics are set by the spring reaction.

With reference to FIGS. 1A–1H, a canted coil spring includes elliptical coils and a dynamic surface contacts the spring coils as shown. As the dynamic surface moves against the spring, the spring tends to rotate or to rotate. The end of the minor axis that is in the contact quadrant tends to rotate or to rotate towards the contact point.

The rotation is dependent upon the dynamic surface contact angle and its direction of travel as well as the spring groove configuration.

None of the views 1A through 1H are related to each other but are presented in order to illustrate spring/surface interaction. Each one represents a unique case. FIGS. 2A through 2D, 3A through 3D, 5A through 5D, 6A through 6D, 8A through 8D, 9A through 9D, 11A through 11D, 12A through 12D, all show the rotation tendency of the canted coil spring.

Figure 2:
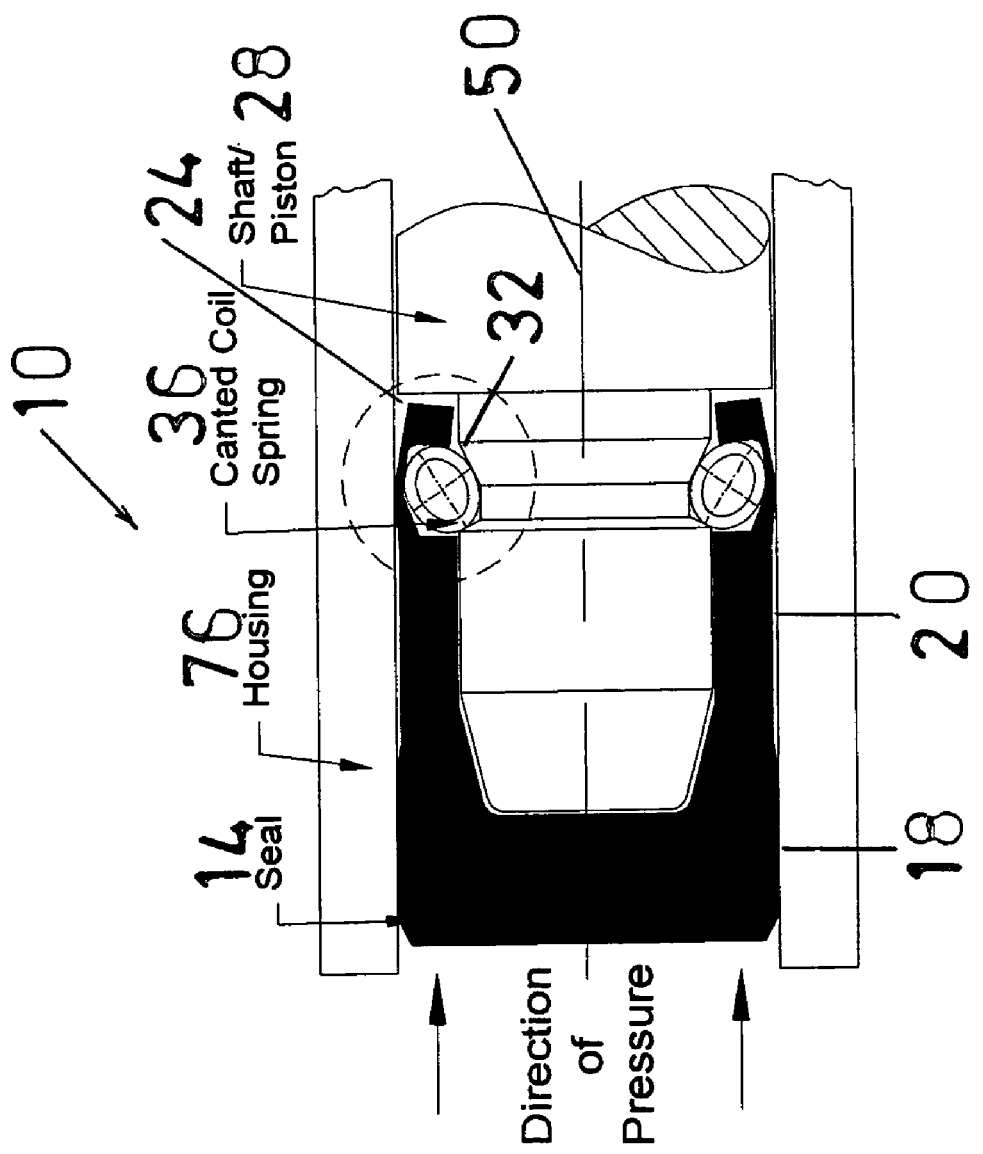
FIG. 2 is a side/cross sectional view of a snap-unlocking, latching cover seal in accordance with the present invention generally showing a seal body with an extended cylindrical sleeve, a piston, a biasing element, and surfaces for effecting sealing between the housing and the sleeve as well as an axial force to provide locking and latching.

With reference to FIG. 2, there is shown seal apparatus 10 in accordance with the present invention generally including a cover seal 14 having a body 18 and an extending cylindrical sleeve 20 having a radial internal groove 24 therein.

A piston 28 is provided which includes a circumferential groove 32 an elliptical spring 36 provides a biasing element and is disposed between the internal groove 24 and the circumferential groove 32.

With reference to FIGS. 2A and 2B, surfaces including a generally right angle shoulder 40 formed in the internal groove 24 and an opposing angled shoulder 44 formed in the circumferential groove 32 orient the spring 36 so that a point of contact between the elliptical spring 36 and the angled shoulder 44 is above an endpoint of a major axis of the spring 36 which provides locking between the seal 14 and the piston 28 which at the same time providing an axial force between the seal 14 and piston 28 to prevent movement along a longitudinal axis 50 of the seal 14 and piston 28, see FIG. 2.

FIG. 2B most clearly shows the relative positioning between the point of contact and the endpoint 54 of the major axis 56.

Figure 6:
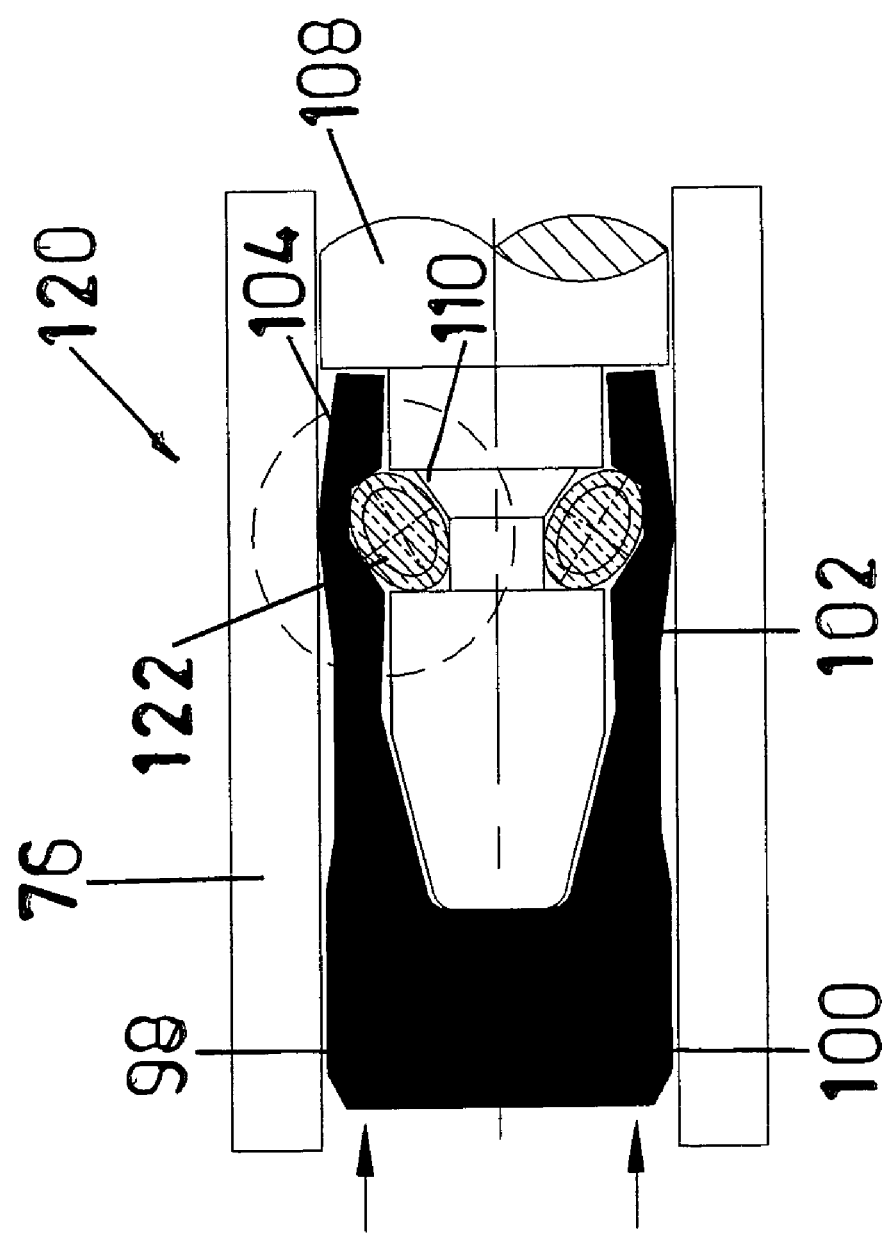
FIGS. 6, 6A, 6B, 6C, 6D are similar to the seal and the piston shown in FIG. 4 again showing differences in surfaces for providing locking and latching of the seal to the piston.
Figure 6A:
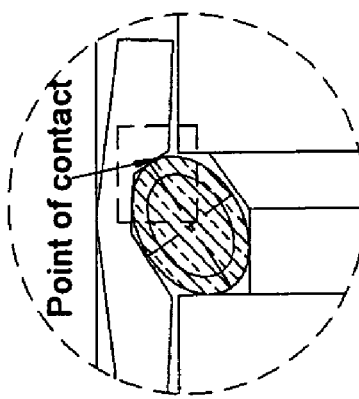
Figure 6B:
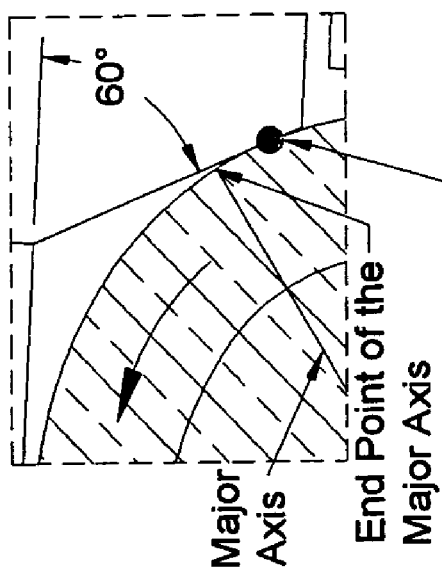
Figure 6C:
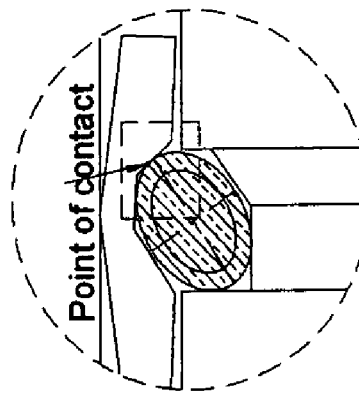
Figure 6D:
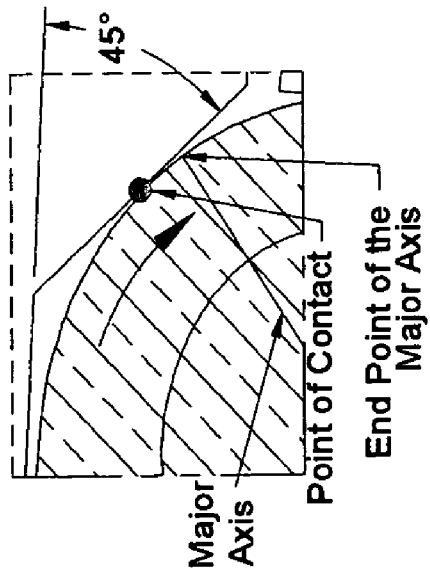

A point of contact 60 is a point at which the spring 36 contacts the surface 44. Terminology of these points is also included in the drawings for clarity. As shown in FIG. 6, when the angled surface 44 is at 60°, a point of contact 60 is above the endpoint of the major axis 54 and the seal 14 is locked to the piston 28.

As defined in the present application, locking is meant to be the permanent retention of the seal 14 to the piston 28. Latching, on the other hand, is defined as holding a seal 14 to the piston 28 within a specific force range that allows the seal 14 and piston 28 to disengage without damage to the spring 36.

In an alternative embodiment shown in FIGS. 1C and 1D, and angled shoulder 66 disposed at a 45° angle results in a point of contact 70 being disposed below the endpoint of the major axis 72 resulting in latching between the cover seal 14 and the piston 28.

In either instance, the spring 36 also provides sealing in between a housing 78 and the piston 28, see FIG. 2.

The structure of the seal apparatus 10 provides for easy assembly of the seal 14 onto the piston 28 and provides for latching or locking, as hereinabove noted. Also hereinabove noted, the structure of the present invention also provides for an absence of axial play between the seal 14 and the piston 28. The higher the spring force the lower the possibility of axial play between the seal 14 and the piston 28 and also higher radial force to affect sealing between the seal 14 and the housing 76.

With reference to FIGS. 3, 3A, 3B, 3C, 3D, there is shown an alternative embodiment 80. The present invention utilizing a canted coil spring filled with an elastomer, or spring loaded O-ring, 84. Common reference numbers in FIG. 2 represent identical or substantially similar components to those hereinbefore discussed in connection with the seal apparatus 10 shown in FIG. 2, the latching and locking surface arrangements are shown in FIGS. 3A–3D correspond to those shown in FIGS. 2A–2D.

A spring loaded O-ring 84 provides more even distribution of the force acting on the seal 14, thus enhancing sealing ability between the seal 14 and the housing 78.

In a latching or locking application, a more even distribution of the force reduces stress concentrations along the latching, locking areas, thus reducing the possibility of axial movement during operation, especially when giving the soft materials such as PTFE or PTFE composition.

Filling the spring with an elastomer covers the space in between coils, thus increasing the area of contact and increasing the force required to deflect the spring. This results in a higher force to disconnect and a higher force to latch.

At the same time, a higher radial force is achieved resulting in better sealing between the seal and the housing and the variation and seal forces affected by the derometer of the elastomer.

A soft derometer, for example, 30 will allow the elastomer to flow into open spaces within the groove cavity, which will result in lower forces being developed and providing a lower latching force at disconnect.

At the same time, the seal 10 will generate a lower radial sealing force between the seal 14 and the housing 76. On the other hand, a higher derometer will do the opposite, thus increasing the force developed, resulting in increase latching force and increased sealing ability.

Figure 3:
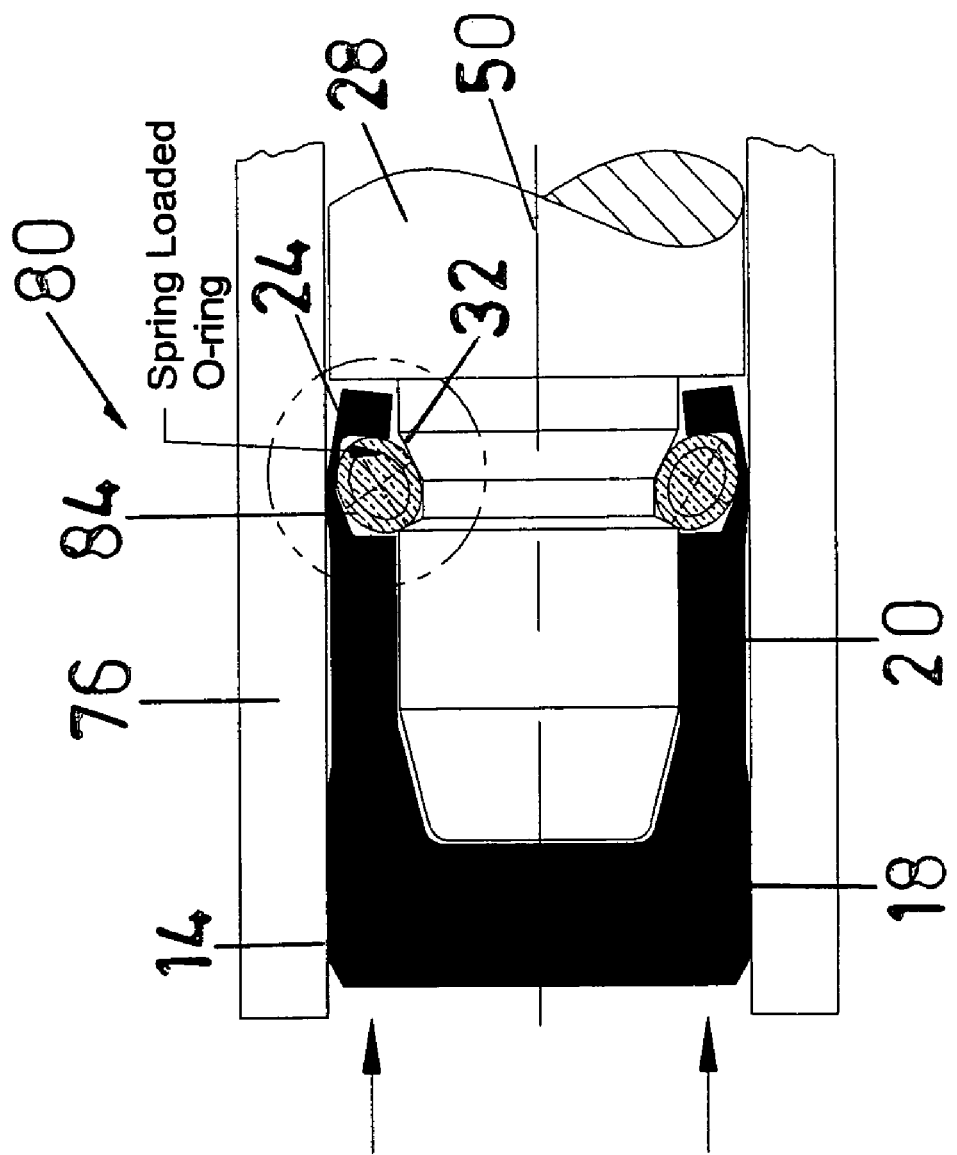
FIG. 3 is similar to the seal apparatus shown in FIG. 2 further including a biasing element comprising a spring filled with an elastomer.
Figure 3B:
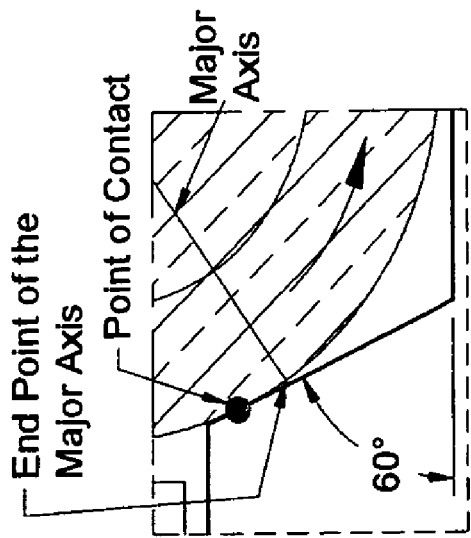
FIGS. 3A and 3B are enlarged drawings of the surfaces shown in FIG. 3 and correspond to FIGS. 1A and 1B and illustrates surfaces for locking of the seal to the piston.
Figure 3D:
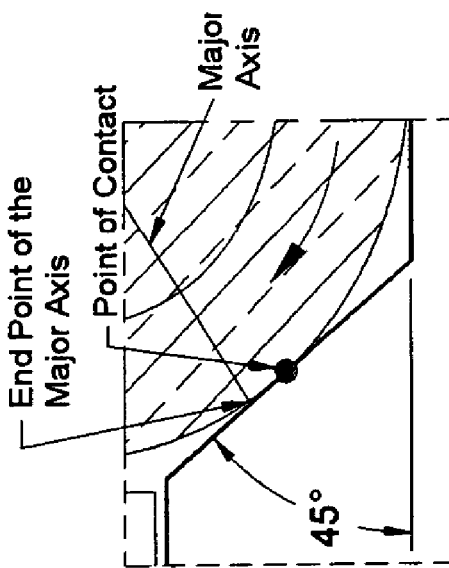
FIGS. 3C and 3D are similar to FIGS. 2C and 2D illustrating surfaces providing latching between the seal and the pistons.
Figure 3A:
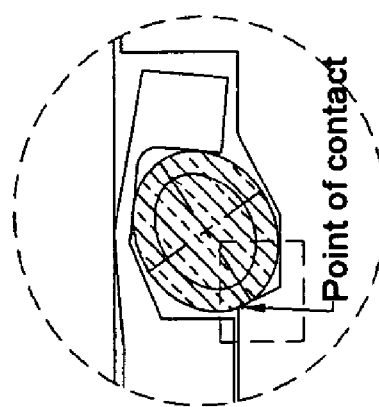
Figure 3C:
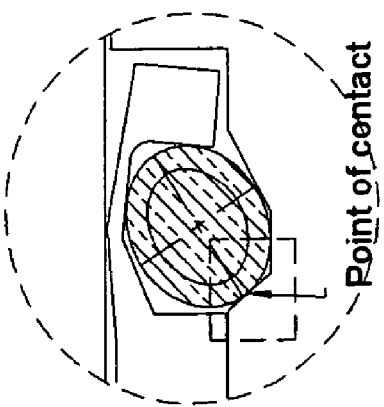
Figure 4A:
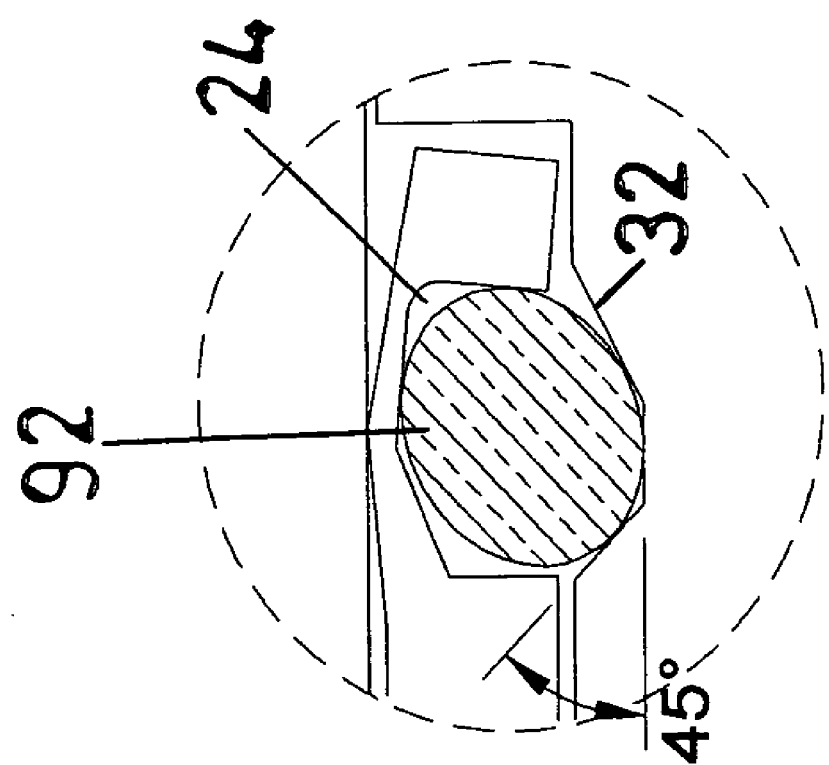
FIG. 4 is an alternative embodiment of the present invention utilizing an O-ring alone as the biasing element for providing latching between the seal and the piston, 3A showing an enlarged diagram of the surface of an O-ring.

With reference to FIG. 4, there is an alternative embodiment 88 in accordance with the present invention utilizing an O-ring 92 as a latching means. The degree of latching will depend upon the derometer of the O-ring. The lower the derometer, the lower the latching force required to latch and disconnect, where a higher derometer will increase the force required to latch and disconnect. An enlarged view of the O-ring 92 within the grooves 24, 32 is shown in FIG. 3A.

With reference to FIGS. 5, 5A–5D, there is shown an alternative embodiment 96 of the present invention generally including a cover seal 98 having a body 100 and a sleeve 102, the sleeve 102 having a groove 104, a piston 108 includes a groove 110, and a spring 112 is disposed within the grooves 104, as shown in FIGS. 5A–5D.

Figure 5:
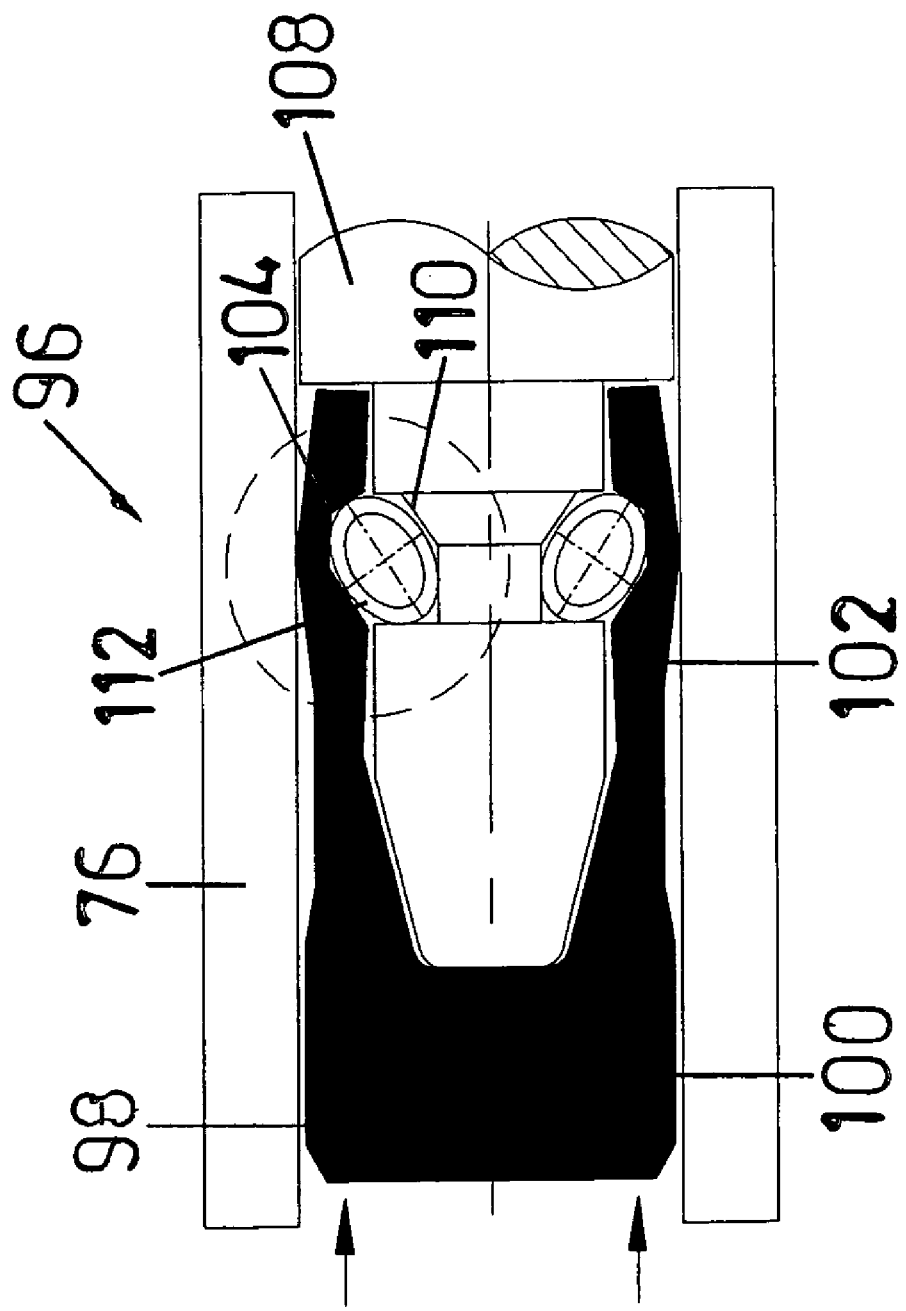
FIG. 5 is an alternative embodiment of the present invention utilizing a surfaces for locking the seal to the piston as shown in FIGS. 5A and 5B and latching the seal to the piston shown in FIGS. 5C and 5D.
Figure 5A:
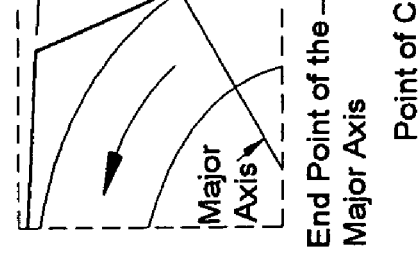
Figure 5B:
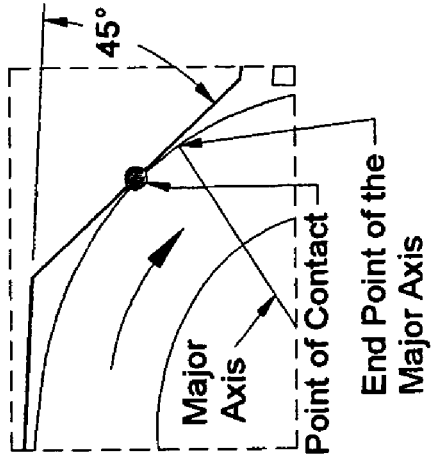

As illustrated in FIGS. 5A–5B, the circumferential groove 110 includes a generally right angled shoulder 114 and the internal groove includes an opposing angled shoulder 116 for orienting the spring 112 with a point of contact between the elliptical spring and the angled shoulder disposed below the endpoint of the major axis to provide locking seal 98 and piston together.

Figure 5C:
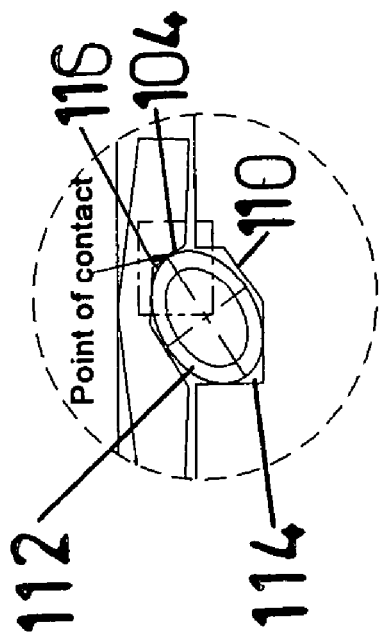
Figure 5D:
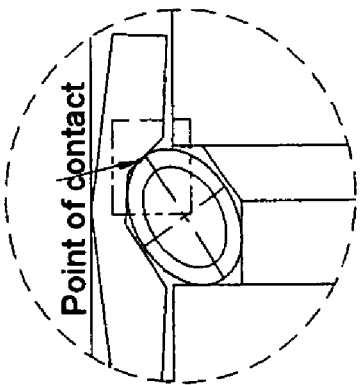

A latching configuration is shown in FIGS. 5C–5D.

Figure 7:
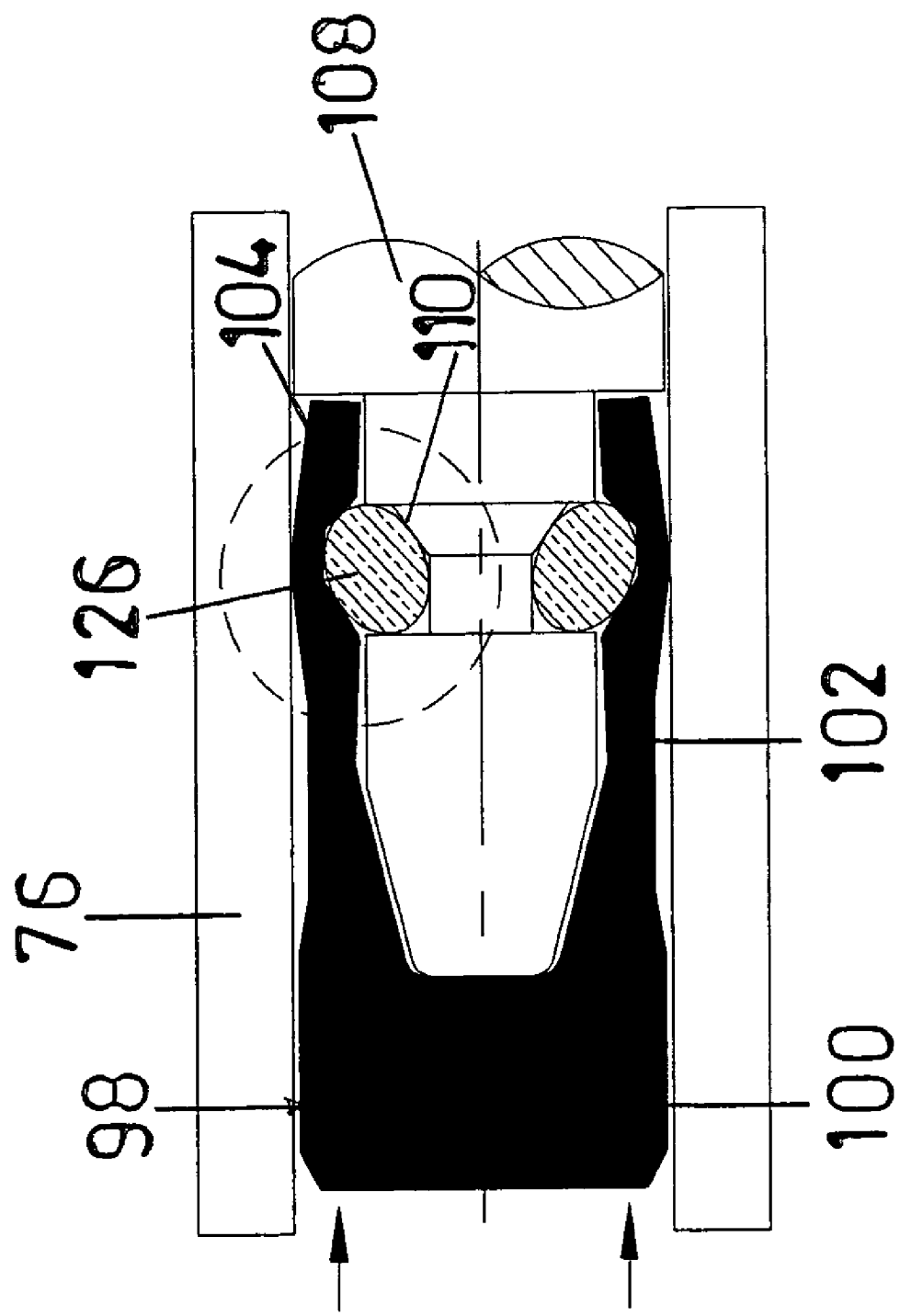
FIG. 7 is a view of an alternative embodiment of the present invention similar to FIG. 6 using however an O-ring as a biasing element.

Yet another embodiment 120 of the present invention is shown in FIGS. 6, 6A–6D which is similar to the embodiment 96 except that an elastomer filled spring 122 is utilized. Common reference numbers refer to identical or substantial similar structure hereinabove discussed in connection with the embodiment 96 shown in FIGS. 5, 5A–5D. FIG. 7 shows the same type of design but utilizing an O-ring 126 for latching, see FIG. 6A for details of the O-ring 126 positioning.

FIGS. 8, 8A–8D show still another embodiment 120 of a seal 132 for a uni-directional high pressure application which includes a body 134 and an extending cylindrical portion 136 having a circumferential groove 138, a piston 142 includes a bore 144 with a radial internal groove 148 therein all disposed within a housing 152.

Figure 8:
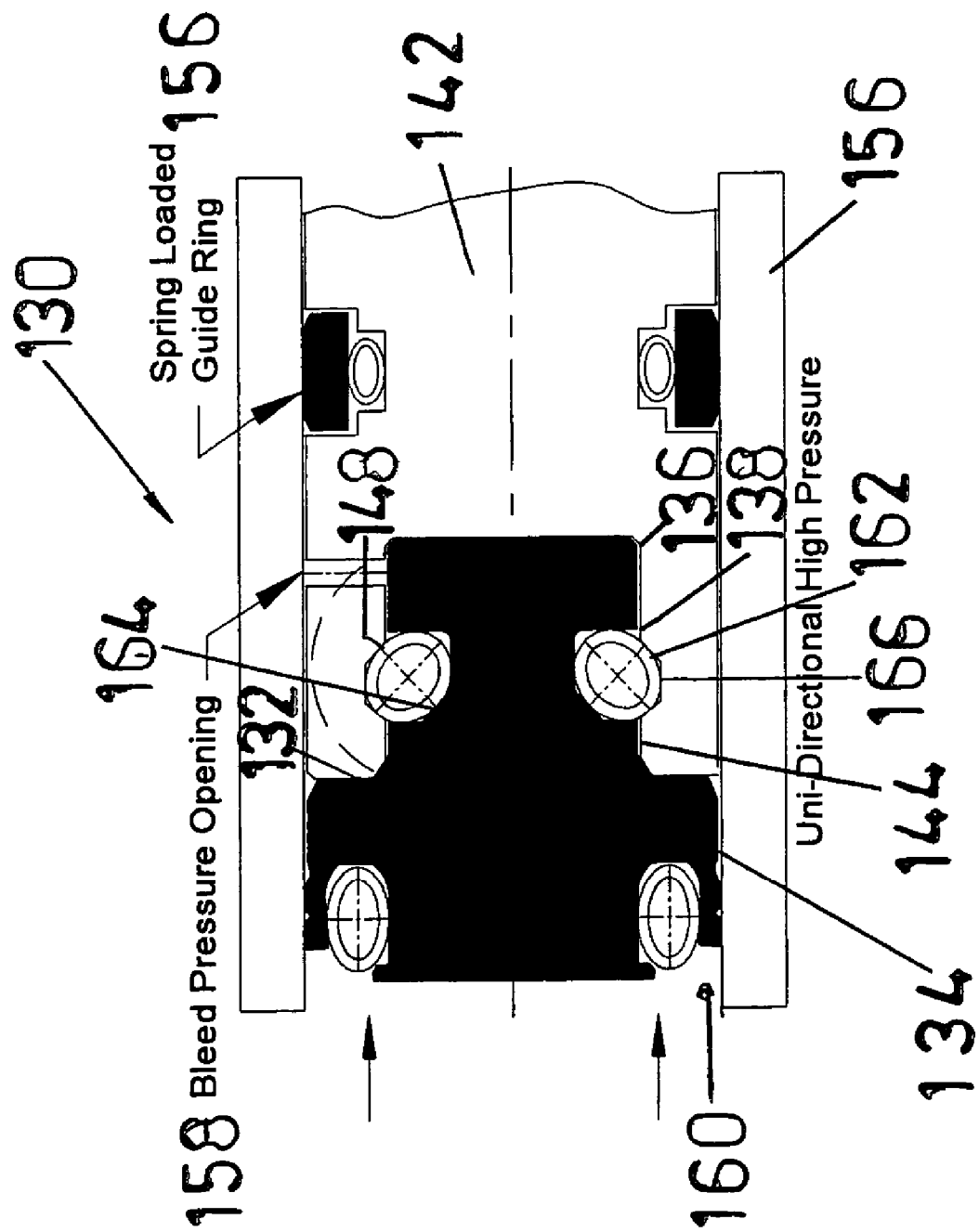
FIGS. 8, 8A, 8B, 8C, 8D illustrate a seal apparatus in accordance with the present invention in which the latching/locking biasing element is disposed in a cylindrical portion in the seal.
Figure 8A:
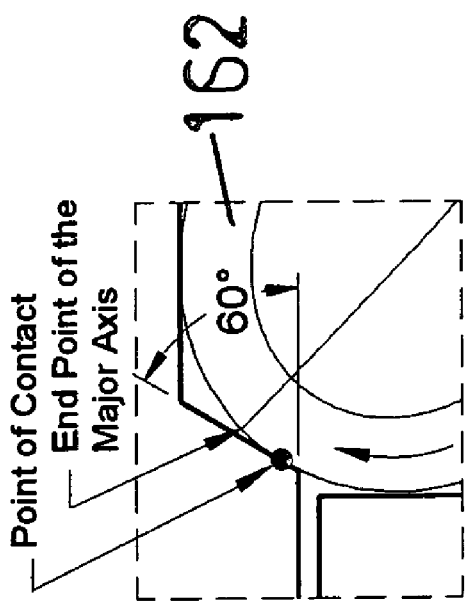
Figure 8B:
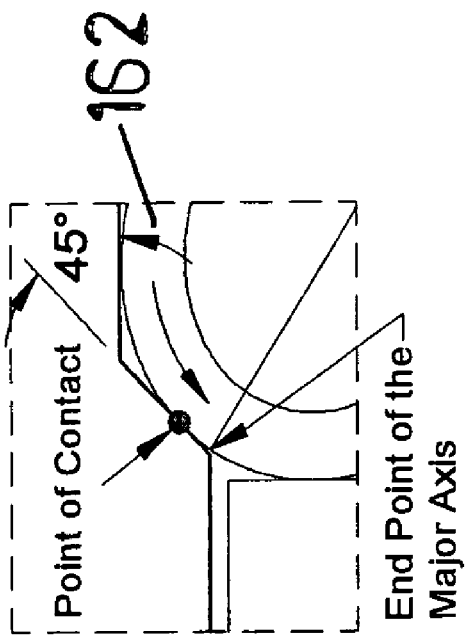
Figure 8C:
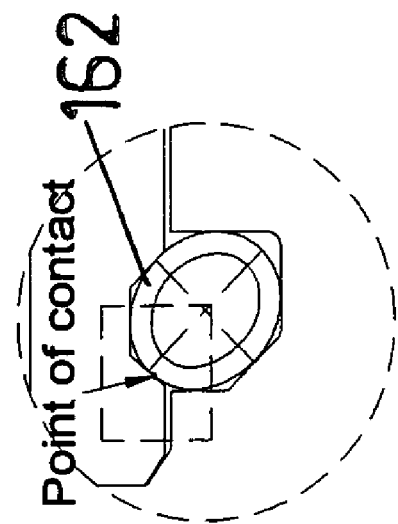
Figure 8D:
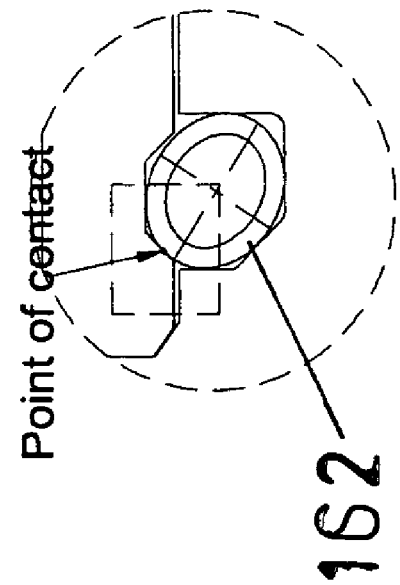

Other elements shown including a spring loaded guide ring 156, a bleed pressure opening 158, and seal 160 in FIG. 8 are not part of the present invention.

A canted coil spring 164 provides a biasing element and is disposed within the grooves 138, 148.

AS hereinbefore described in connection with FIGS. 2–7, a surface 164 in the circumferential groove 138 along with surface 166 disposed in the internal groove 148 orient the spring 162 in order to effect latching or locking between the piston 142 and the seal 132.

The position of the spring determines the manner in which locking or latching action will occur, as hereinabove described and illustrated in FIGS. 8A, 8B, 8C, and 8D.

With reference to FIG. 9, there is shown another embodiment 170 in accordance with the present invention which is of a design similar to the embodiment 130 shown in FIG. 7 with the exception that a spring loaded O-ring 174 is utilized. Other elements of the embodiment 170 indicated by the character references are identical or substantially similar to those hereinabove discussed in connection with the embodiment 130 of FIG. 8.

FIGS. 9A–9B illustrate the function of the surfaces as hereinabove discussed in connection with the earlier presented embodiments.

Figure 10:
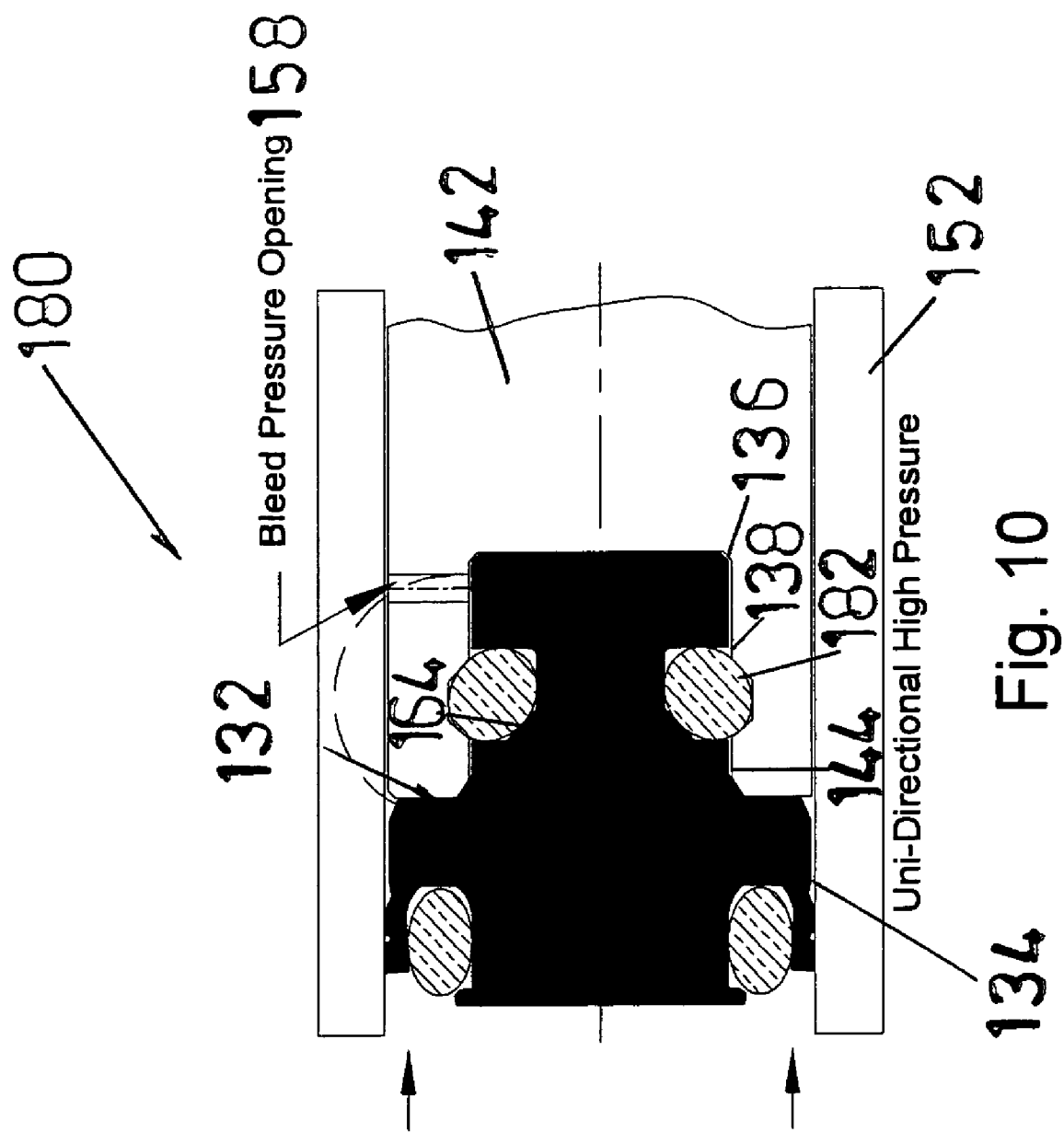
FIG. 10 is a design which an O-ring is used as a latching element.
Figure 10A:
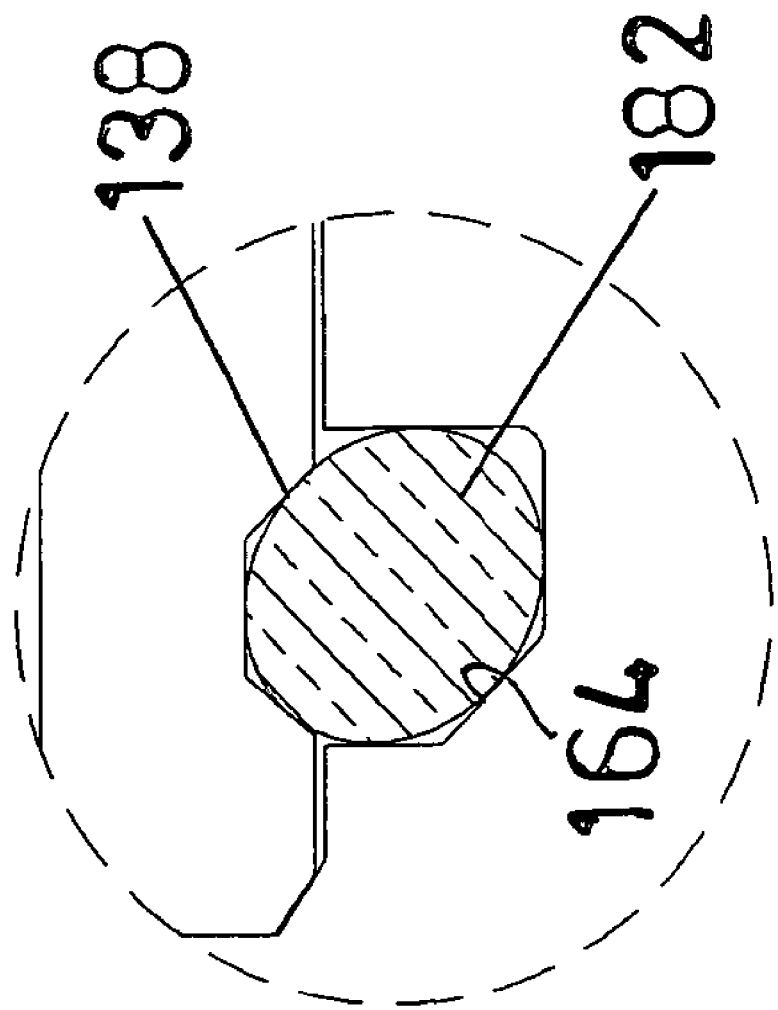

FIGS. 10 and 10A show yet another embodiment 180 similar to that shown in FIGS. 8 and 9 except that an O-ring 182 is utilized as the latching means between the piston 142 and the seal 132.

Figure 11:
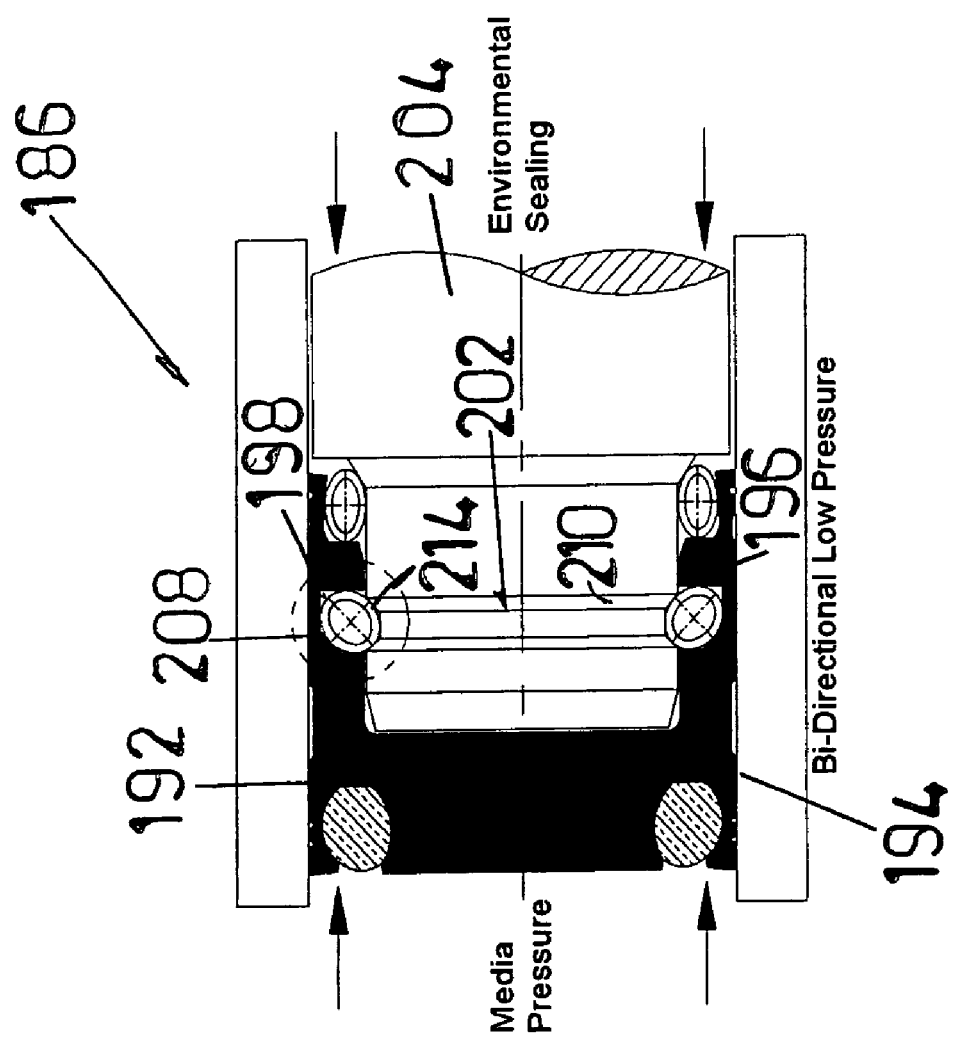
FIGS. 11, 11A, 11B, 11C, 11D illustrate a bi-directional seal that can effect sealing in both directions.
Figure 11B:
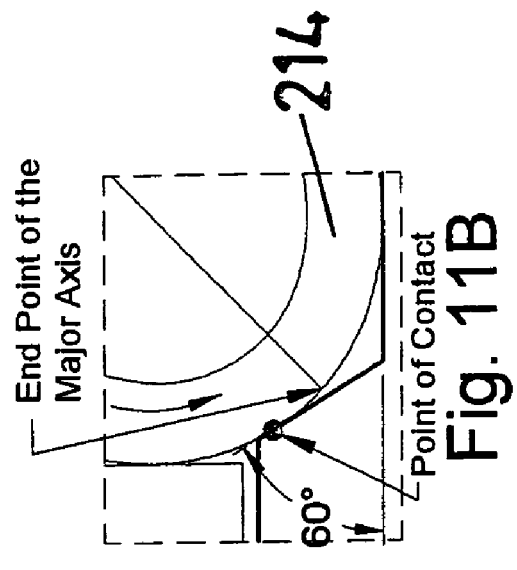
Figure 11D:
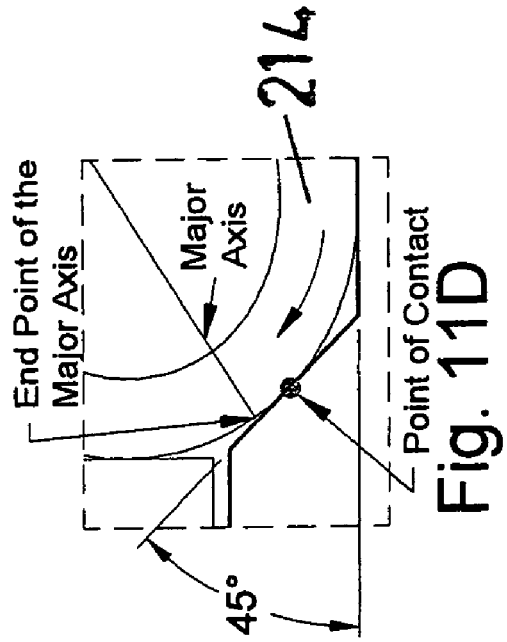
Figure 11A:
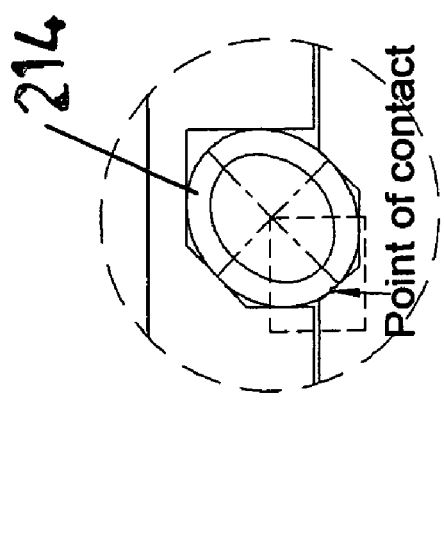
Figure 11C:
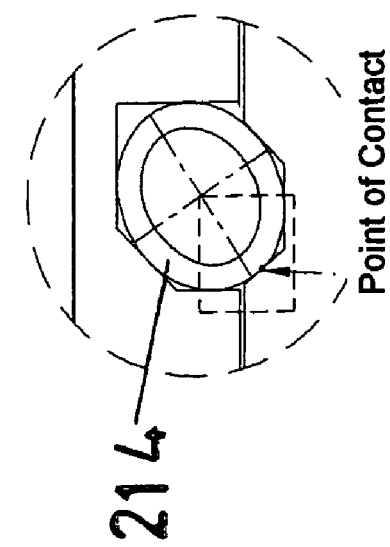
Figure 12:
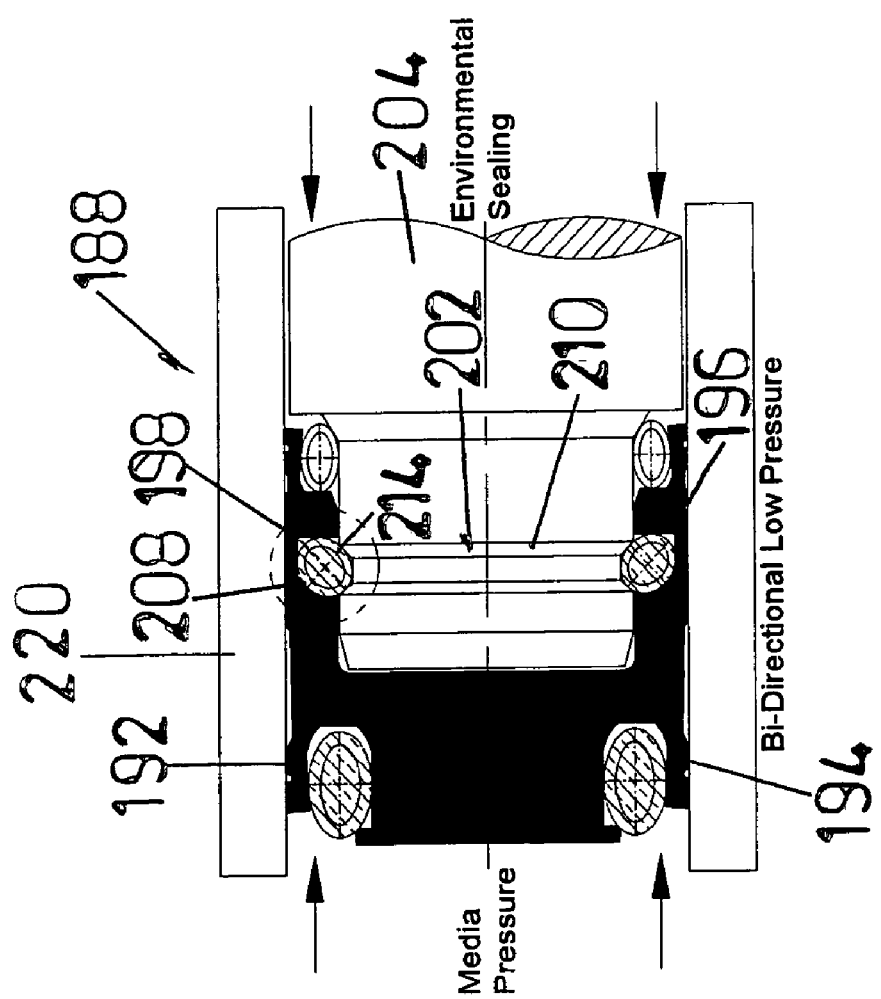
FIGS. 12, 12A, 12B, 12C, 12D is similar to that shown in FIG. 11 utilizing a spring loaded O-ring.

FIGS. 11 and 12 show bi-directional low pressure seal apparatus 186, 188 respectively each including a cover seal 192 with a body 194 with a sleeve 196 having an internal groove 198 along with a groove 202 circumferentially formed in a piston 204 and a surfaces 208, 210 for orienting canted coil spring 214 (see FIG. 11) or an elastomer filled spring 216 (see FIG. 12) in order to provide both sealing between the sleeve 196 and a housing 220.

FIGS. 11A–11D and 12A–12D showing orientations similar to that hereinbefore discussed or providing either latching or loading between seal 192 and piston 204. Accordingly, a repeat of that description is not repeated for the sake of brevity.

Figure 12A:
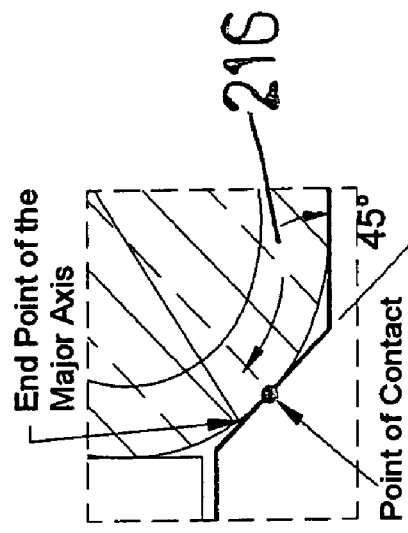
Figure 12B:
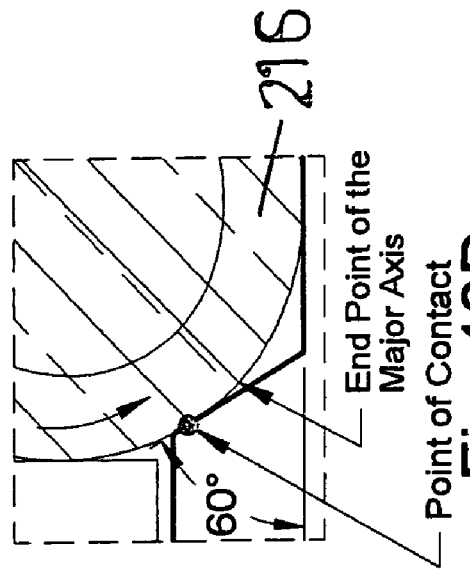
Figure 12C:
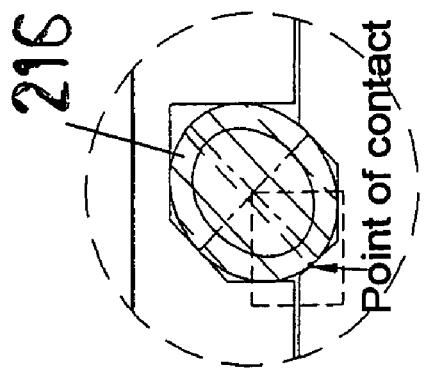
Figure 12D:
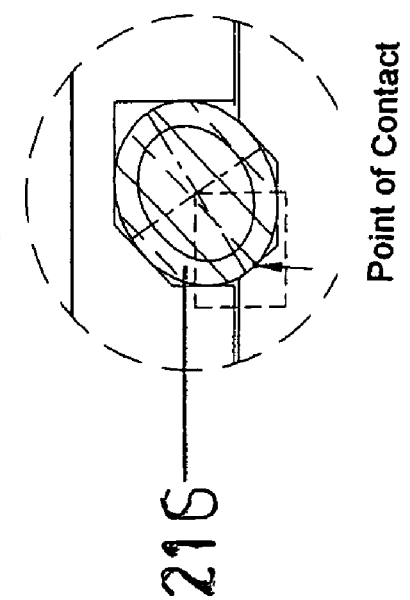
Figure 13:
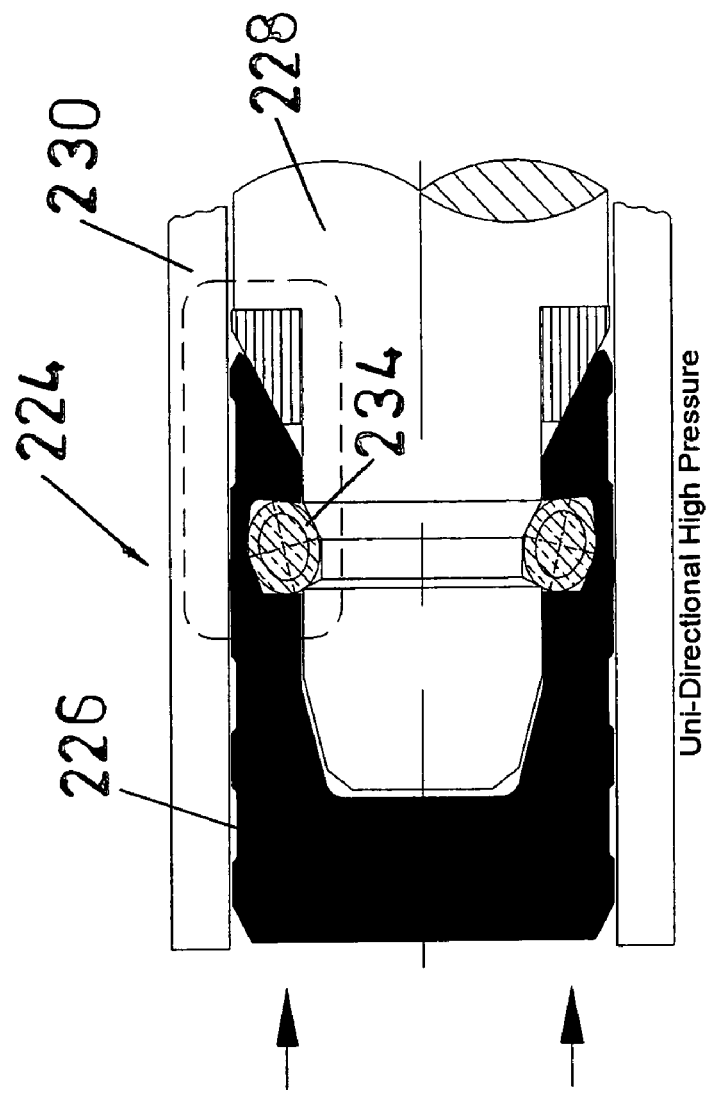

FIG. 13 shows an embodiment 224 having a snap on cover seal 226 for both low and high pressure applications for sealing between a reciprocating piston 228 and housing 230. FIGS. 13 and 13B show a spring loaded O-ring 234 as the locking means, FIG. 12A shows the canted coil spring 236 as a locking means while FIG. 12C illustrates an O-ring 238 as a latching means. Operation of the seal apparatus as hereinabove described in connection with the earlier presented embodiments.

Figure 14:
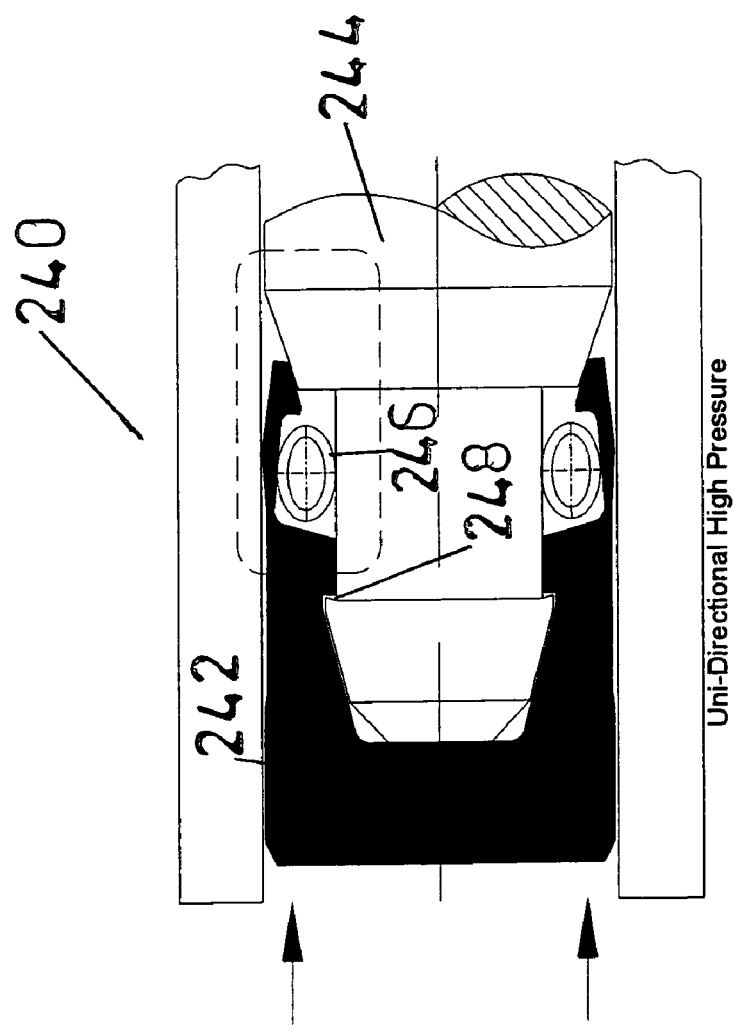

FIG. 14 illustrates seal apparatus 240 including a cover seal 242 and piston 244 along with a spring 246 for providing permanent locking between the piston 244 and the seal 242. This particular design is normally used in small diameters due to space requirements and conditions of relatively low pressure to perhaps 100 psi. The locking between the piston 244 and the seal 242 is accomplished through the elasticity of the seal which is forced over a notch 248 on the piston 244, a seal 242 is loaded by the O-ring 246 also shown in FIG. 13A, a spring loaded O-ring 250.

Although there has been hereinabove described a specific cover seals with latching locking features in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations, or equivalent arrangements which may occur to those skilled in the art, should be considered to be within the scope of the present invention as defined in the appended claims.

What is claimed is:

1. Seal apparatus comprising:

a cover seal having a body and an extending cylindrical sleeve, the sleeve having a radial internal groove;

a piston having a circumferential groove therein;

a biasing element disposed within the internal and circumferential grooves, said biasing element comprising an elliptical coil spring, the internal groove includes a generally right angle shoulder, the circumferential groove includes an opposing angled shoulder and said elliptical spring is oriented by the right angle shoulder and angled shoulder with a point of contact between said elliptical spring and said angled shoulder spaced apart from an endpoint of a major axis of the spring to provide latching or locking between the seal and said piston; and surfaces disposed in said internal and circumferential grooves and orienting said biasing element in order to effect sealing between a housing and the sleeve and an axial force to provide latching or locking between the seal and said piston.

2. The seal apparatus according to claim 1 further comprises an elastomer filling said elliptical spring.

3. Seal apparatus comprising:
a cover seal having a body and an extending cylindrical portion, the cylindrical portion having a circumferential groove;
a piston having a bore therein with a radial internal groove;
a biasing element disposed within the internal and circumferential groove; and
surfaces disposed in said internal and circumferential grooves and orienting said biasing element in order to effect latching or locking between the seal and said piston.

4. The seal apparatus according to claim 3 wherein said biasing element comprises an O-ring.

5. The seal apparatus according to claim 3 wherein said biasing element comprises an elliptical coil spring having an elastomer filling said elliptical spring.

* * * * *